3,047,366
PRODUCTION OF PURE ARSENIC AND PHOSPHORUS

Forrest V. Williams, Dayton, Ohio, assignor to Monsanto Chemical Company, St. Louis, Mo., a corporation of Delaware
No Drawing. Filed Dec. 21, 1959, Ser. No. 860,663
6 Claims. (Cl. 23—223)

The present invention relates to the production of very pure elements such as arsenic and phosphorus suitable for use in the manufacture of electronic and semiconductor materials such as indium arsenide, indium phosphide, and mixed metal arsenides and phosphides.

It is an object of the invention to prepare an element of the class consisting of arsenic and phosphorus in a form which is relatively free from impurities and which is more uniform in its electrical characteristics as well as in its chemical derivatives than has been possible by prior art methods.

In the production of elemental phosphorus and arsenic, it has been found that the chemical elements which occur together with these elements are carried into the product. Examples of such impurities include the halogen elements such as fluorine, chlorine, etc., and also sulfur compounds. Certain forms of phosphorus such as the so-called white phosphorus which are stored under water or oil may also pick up impurities therefrom. It has been attempted to purify the elemental phosphorus and arsenic by distillation, e.g., at the boiling point, but the conventional distillation processes have been found to offer little improvement in the purity of the element which is thus obtained.

It has now been found that elemental forms of phosphorus and arsenic including the various allotropic forms thereof may be greatly improved in purity by treatment of the element in gaseous form at a specific range of elevated temperatures. In order to carry out such a purification, the phosphorus or arsenic is passed directly into a heated conduit made of an inert material such as quartz, while excluding all foreign gases other than the vapor to be treated.

It has been found that a temperature in the range of from 850° C. to 1,000° C. is of utility for this purpose, a preferred range being from 900° C. to 950° C. The time during which the gaseous phosphorus or arsenic is subjected to this high temperature is not critical and may be varied as convenient from a minute or less to an hour or more. The pressure is likewise a non-critical variable, so that vacuum, atmospheric, and pressure conditions may be used as desired. However, no gases other than the vapor of the element being treated can be present in the treatment zone.

After the phosphorus or arsenic has been subjected to the heat treatment, such as by passing the gaseous element through a packed section of a conduit, e.g., by passage through quartz beads or quartz wool located in a quartz tube at the said elevated temperature, the phosphorus or arsenic is collected by conventional means. In the method described, using a continuous conduit, the collection zone may be a cooler section of the tubular reactor or a cool condenser. If desired, receiving vessels which may be sealed off may also be employed in this purpose, thereby permitting the phosphorus or arsenic to be collected in an end tube provided with a gas vent. The collection tube is thereafter sealed off to keep the phosphorus or arsenic free from contact with air and other impurities until it is desired for further use.

In the manufacture of electronic and semiconductor components, it has been found that phosphorus and arsenic compounds must be of an unusually high order of purity in order to function uniformly and effectively in these fields. For example, in the manufacture of indium phosphide, a sample of the purified phosphorus collected in a sealed off tube as described above, may later be connected to a gaseous reaction system. The phosphorus is then heated in its tube in order to volatilize the said phosphorus into a further tubular section in which elemental indium is located. The phosphorus then reacts with the indium to give the desired indium phosphide. By such methods, other semiconductor components, such as gallium phosphide, aluminum phosphide, boron phosphide and zinc phosphide, may also be prepared. Mixed metal phosphides such as zinc germanium phosphide, $ZnGeP_2$, are also readily prepared from the present purified form of elemental phosphorus prepared in accordance with the method of the present invention. The corresponding arsenic compounds are similarly prepared.

The apparatus employed in carrying out the present invention may also be modified to use vertical tubes, for example, in which arsenic or phosphorus is volatilized from either allotropic form maintained in a storage receptacle, directly into a tubular section maintained at the aforesaid higher temperature, and then condensed in a suitable vessel. However, it has been found that the temperature range of from 850° C. to 1,000° C. is critical in this relationship, and that the use of the lower temperature such as 700° C. does not effect any purification. It has also been found that the mere sublimation of elemental phosphorus or arsenic in a vacuum, for example, at 450° C. which is a conventional sublimation temperature for phosphorus, or 600° C. for arsenic does not accomplish the purification which is achieved by the practice of the present invention.

The following examples illustrate specific embodiments of the present invention.

*Example 1*

The purification of red phosphorus was carried out by placing a quartz boat of phosphorus in a quartz tube of one inch diameter and 24 inch length. The quartz tube was provided with two independent heating jackets as well as a third cooling section located in the atmosphere. At the exit end of the tube a connection was made to a previously prepared seal-off section for the collection of the purified phosphorus in a sealed-off quartz tube. The first furnace which was placed around the boat containing the red phosphorus was heated to a temperature of 450° C. while the middle reactor section which was packed with quartz beads located in the quartz tube, was maintained at a temperature of 925° C. The third section was at substantially atmospheric temperature. The gaseous phosphorus at atmospheric pressure after the purification treatment had been completed, passed to the condenser section where the phosphorus condensed on the walls of the quartz receiving tube. The pressure in the reaction system was maintained at 760 mm. Hg. After the above process had been conducted for a period of 2 hours, the receiving tube was sealed off for storage until needed for subsequent processing.

The electrical properties of the test sample of the above example indicates that the phosphorus has a purity of better than 99.9999+% in contrast to the starting phosphorus material which had a purity of only 99.99%.

The great purity of the phosphorus and arsenic produced in accordance with the method of the present invention is difficult to analyze by conventional chemical methods, and it was therefore found that an adequate indication of purity could only be obtained by utilizing the purified phosphorus or arsenic by reaction with indium in order to make indium phosphide or arsenide, and then to determine the electronic properties of such indium compound. For example, the indium phosphide thus prepared by volatilizing the phosphorus into a body of metallic indium (99.999% pure) employing a temperature of 450° C. to volatilize the phosphorus, and a temperature of 1060° C. to effect the reaction of the indium and the phosphorus, gave a crystalline form of indium phosphide. This product was subjected to measurement of the electrical properties to determine the concentration of impurities expressed as atoms of impurities per cc. of indium phosphide.

Control tests were also performed in which C.P. phosphorus samples, both red and white were transformed into indium phosphide without the present thermal treatment. These samples were also used for electrical testing but were found to give products inferior to those employing the thermally treated phosphorus.

*Example 2*

A similar treatment, as described above, but with the use of metallic arsenic was also found to give a purified product.

As an indication of the purification accomplished with arsenic, a sample of arsenic, as received, and then transformed to InAs had a purity of $5.6 \times 10^{16}$ carriers/cc. InAs The same starting arsenic when heated to 900° C. at atmospheric pressure with only arsenic vapor, e.g., no foreign gases present, gives an InAs product of $4.82 \times 10^{16}$ carriers/cc. InAs

What is claimed is:

1. Process for purification of an element selected from the class consisting of arsenic and phosphorus containing impurities of the group of fluorine, chlorine, and sulfur compounds which comprises volatilizing the said element and impurities and subjecting the same in the substantial absence of foreign gases to a temperature in the range of from 850° C. to 1,000° C. and thereafter cooling the said gaseous mixture to condense the purified element.

2. Process for purification of an element selected from the class consisting of arsenic and phosphorus containing impurities of the group of fluorine, chlorine, and sulfur compounds which comprises volatilizing the said element and impurities and subjecting the same in the substantial absence of foreign gases to a temperature of from 900° C. to 950° C. and thereafter cooling the said gaseous mixture to condense the purified element.

3. Process for purification of elemental phosphorus containing impurities of the group of fluorine, chlorine, and sulfur compounds which comprises volatilizing the said phosphorus and impurities and subjecting the same in the substantial absence of foreign gases to a temperature in the range of from 850° C. to 1,000° C. and thereafter cooling the said gaseous mixture to condense the purified phosphorus.

4. Process for purification of elemental phosphorus containing impurities of the group of fluorine, chlorine, and sulfur compounds which comprises volatilizing the said phosphorus and impurities and subjecting the same in the substantial absence of foreign gases to a temperature of from 900° C. to 950° C. and thereafter cooling the said gaseous mixture to condense the purified phosphorus.

5. Process for purification of elemental arsenic containing impurities of the group of fluorine, chlorine, and sulfur compounds which comprises volatilizing the said arsenic and impurities and subjecting the same in the substantial absence of foreign gases to a temperature in the range of from 850° C. to 1,000° C. and thereafter cooling the said gaseous mixture to condense the purified arsenic.

6. Process for purification of elemental arsenic containing impurities of the group of fluorine, chlorine, and sulfur compounds which comprises volatilizing the said arsenic and impurities and subjecting the same in the substantial absence of foreign gases to a temperature of from 900° C. to 950° C. and thereafter cooling the said gaseous mixture to condense the purified arsenic.

References Cited in the file of this patent

UNITED STATES PATENTS 171,813    Hunter _____ Jan. 4, 1876

OTHER REFERENCES

Mellor: "A Comprehensive Treatise on Inorganic and Theoretical Chemistry," vol. 8, page 743 (1928 Ed.); vol. 9, page 29 (1929 Ed.), Longmans, Green and Co., New York.

Sidgwich: "Chemical Elements and Their Compounds," vol. 1, 1950 Ed., pages 727, 758 and 759. Oxford Univ. Press, London.

Van Wazer: "Phosphorus and Its Compounds," vol. 1, 1958, page 96, Interscience Pub. Inc.